(12) United States Patent
Horsnell et al.

(10) Patent No.: US 11,579,873 B2
(45) Date of Patent: Feb. 14, 2023

(54) HANDLING LOAD-EXCLUSIVE INSTRUCTIONS IN APPARATUS HAVING SUPPORT FOR TRANSACTIONAL MEMORY

(71) Applicant: Arm Limited, Cambridge (GB)

(72) Inventors: Matthew James Horsnell, Cambridge (GB); Grigorios Magklis, Cambridge (GB); Richard Roy Grisenthwaite, Cambridge (GB); Nathan Yong Seng Chong, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/255,001

(22) PCT Filed: May 9, 2019

(86) PCT No.: PCT/GB2019/051276
§ 371 (c)(1),
(2) Date: Dec. 22, 2020

(87) PCT Pub. No.: WO2020/002869
PCT Pub. Date: Jan. 2, 2020

(65) Prior Publication Data
US 2021/0342152 A1 Nov. 4, 2021

(30) Foreign Application Priority Data
Jun. 25, 2018 (EP) .................................... 18386018

(51) Int. Cl.
*G06F 9/30* (2018.01)
*G06F 9/38* (2018.01)
(52) U.S. Cl.
CPC ........ *G06F 9/30043* (2013.01); *G06F 9/3842* (2013.01)

(58) Field of Classification Search
CPC .................................................. G06F 9/30043
See application file for complete search history.

(56) References Cited

U.S. PATENT DOCUMENTS

2007/0282838 A1* 12/2007 Shavit ................... G06F 9/3834
2009/0089520 A1 4/2009 Saha et al.
(Continued)

FOREIGN PATENT DOCUMENTS

TW 201224991 6/2012

OTHER PUBLICATIONS

International Search Report and Written Opinion of the ISA for PCT/GB2019/051276 dated Aug. 2, 2019, 15 pages.
(Continued)

*Primary Examiner* — Michael J Metzger
(74) *Attorney, Agent, or Firm* — Nixon & Vanderhye P.C.

(57) ABSTRACT

An apparatus is described with support for transactional memory and load/store-exclusive instructions using an exclusive monitor indication to track exclusive access to a given address. In response to a predetermined type of load instruction specifying a load target address, which is executed within a given transaction, any exclusive monitor indication previously set for the load target address is cleared. In response to a load-exclusive instruction, an abort is triggered for a transaction for which the given address is specified as one of its working set of addresses. This helps to maintain mutual exclusion between transactional and non-transactional threads even if there is load speculation in the non-transactional thread.

11 Claims, 11 Drawing Sheets

(56) References Cited

U.S. PATENT DOCUMENTS

2014/0052921 A1* 2/2014 Biles .................. G06F 9/3834
                                                    711/125
2015/0378927 A1* 12/2015 Bradbury ............ G06F 12/0828
                                                    711/141
2016/0378658 A1   12/2016 Gschwind et al.
2017/0004004 A1    1/2017 Guthrie et al.
2017/0286107 A1* 10/2017 Holm .................. G06F 9/3009

OTHER PUBLICATIONS

Extended European Search Report for EP 18386018.8 dated Jan. 15, 2019, 10 pages.
Bedichek, "Some Efficient Architecture Simulation Techniques", Proceedings of the Winter 1990 USENIX Conference, Jan. 22-26, 1990, 12 pages.
Office Action for TW Application No. 108120255 dated Sep. 29, 2022 and English translation, 11 pages.
Office Action for IN Application No. 202117003065 dated Oct. 6, 2022, 7 pages.
Office Action for IL Application No. 279126 dated Dec. 29, 2022, 4 pages.

\* cited by examiner

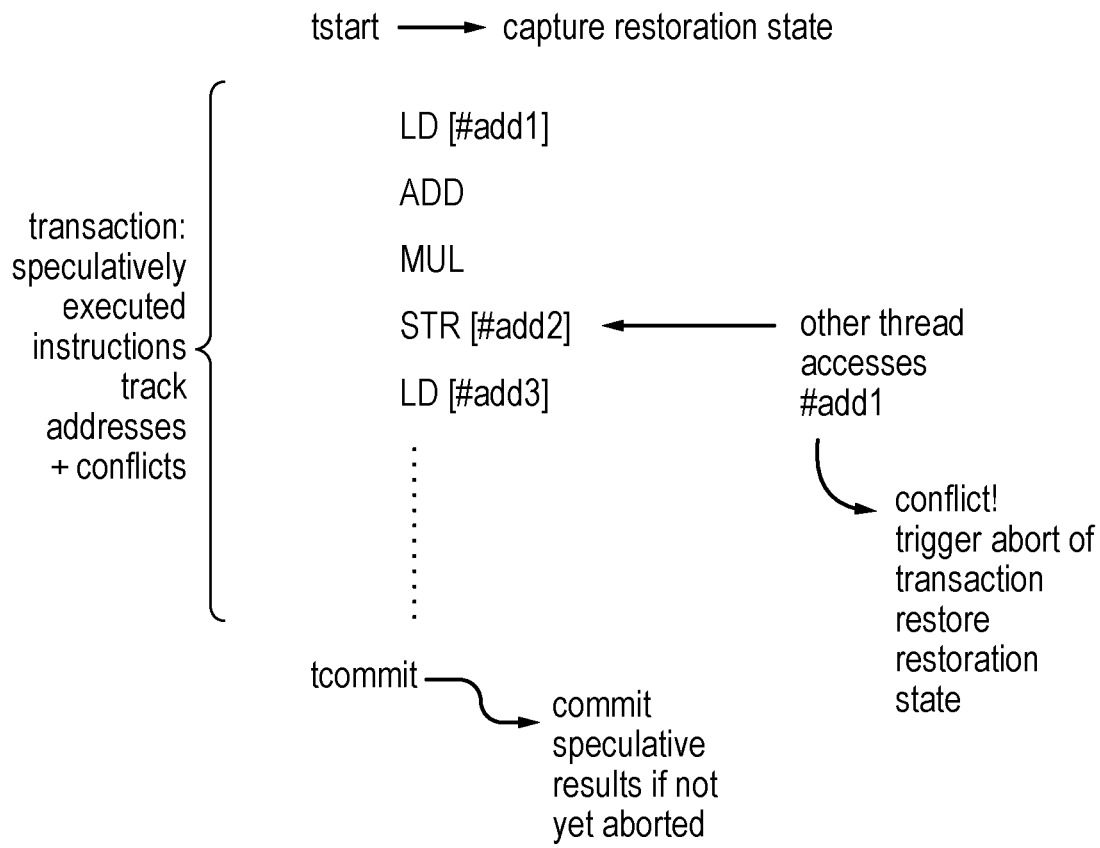

```
loop:
        LDAXR       W5, [X1]          ; read lock with acquire
        CBNZ        W5, loop          ; check if 0
        MOV         W0, #1            ;
        STXR        W5, W0, [X1]      ; attempt to store new value
        CBNZ        W5, loop          ; test if store succeeded and retry if not ; critical region
        LDR         W6, [X2]          ; read shared-variable x
        ADD         W6, W6, #2        ; x += 2
        STR         W6, [X2]
                                      ; end of critical region
        STLR WZR, [X1]                ; clear the lock with release semantics
```

FIG. 5

```
ELIDED_ACQUIRE loop:
        TSTART      X5                ; attempt to start a new transaction
        CBNZ        X5, fallback      ; check if TSTART succeeded
        CHECK(X1)                     ; add the fallback lock to the transactional read set
                                      ; and set W5 to 0 if the fallback lock is free.
        CBZ         W5, enter         ; if the fallback lock is free enter the critical region
        TCANCEL     #63               ; otherwise cancel the transaction with RTRY set to 1
fallback:
        TBZ         X5, #8, lock      ; if RTRY is 0 take the fallback lock
        SUB         W6, W6, #1        ; decrement the retry count
        CBZ         W6, lock          ; take the lock if 0
        WAIT_ACQ(X1==0)               ; wait until the lock is free
        B           loop              ; retry the transaction
lock:
        LOCK(X1)                      ; elision failed, acquire the fallback lock
        DMB ISH                       ; block loads/stores from the critical region
enter:
                                      ; critical section begins
ELIDED_RELEASE
        CHECK_ACQ(W5, X1)             ; set W5 to 0 if the fallback lock is free
        CBNZ        W5, unlock        ; check if 0
        TCOMMIT                       ; the lock was elided, exit the transaction
        B           exit
unlock:
        UNLOCK(X1)                    ; elision failed, release the fallback lock
exit:
                                      ; critical section ends
```

FIG. 6

```
LOCK(Xx)
        PRFM        PSTL1KEEP, [Xx]    ; preload into cache in unique state
loop:
        LDAXR       W5, [Xx]           ; read lock with acquire
        CBNZ        W5, loop           ; check if 0
        STXR        W5, W0, [Xx]       ; attempt to store new value
        CBNZ        W5, loop           ; test if store succeeded and retry if not
UNLOCK(Xx)
        STLR        WZR, [Xx]          ; clear the lock with release semantics
CHECK(Xx)
        LDR         W5, [Xx]           ; read lock
CHECK_ACQ(Xx)
        LDAR        W5, [Xx]           ; read lock with acquire
WAIT_ACQ(Xx==0)
loop:
        LDAR        W5, [Xx]           ; read lock with acquire
        CBNZ        W5, loop           ; spin until (lock == 0)
```

FIG. 7

```
Loop:
        LDAXR       W5, [X1]           ; read lock with acquire
        CBNZ        W5, Loop           ; check if 0
        MOV         W0, #1             ;
        STXR        W5, W0, [X1]       ; attempt to store new value
        CBNZ        W5, Loop           ; test if store succeeded and retry if not
                                       ; critical region
        LDR         W6, [X2]           ; read shared-variable x
        ADD         W6, W6, #2         ; x += 2
        STR         W6, [X2]
                                       ; end of critical region
        STLR        WZR, [X1]          ; clear the lock with release semantics
```

FIG. 8

HANDLING LOAD-EXCLUSIVE INSTRUCTIONS IN APPARATUS HAVING SUPPORT FOR TRANSACTIONAL MEMORY

This application is the U.S. national phase of International Application No. PCT/GB2019/051276 filed May 9, 2019 which designated the U.S. and claims priority to EP Patent Application No. 18386018.8 filed Jun. 25, 2018, the entire contents of each of which are hereby incorporated by reference.

The present technique relates to the field of data processing. More particularly, it relates to data processing apparatuses with support for transactional memory.

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

The property that a critical section of code in a first thread is performed atomically relative to a critical section of code in a second thread may be referred to as "mutual exclusion". The critical sections may include identical sequences of instructions in the respective threads, or could include different sections of code which both update a shared resource. Mutual exclusion may be satisfied if the result of both critical sections being performed is either such that the result is equivalent to the first thread performing the critical section and then the second thread performing its critical section using the result of the critical section in the first thread, or vice versa with the result being such that the first thread uses the result of the critical section in the second thread for the processing of the shared resource in the first thread. An outcome where both the critical sections of the first and second threads are processed in parallel, but the critical section in one thread does not consider the updated value of the shared resource resulting from the critical section in the other thread, may violate mutual exclusion.

One technique for maintaining mutual exclusion between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflicts between threads accessing shared resources can be to use transactional memory support. A data processing system may have circuitry to support execution of a transaction within a thread of data processing by the processing circuitry. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance (compared to lock-based approaches) by allowing more threads to concurrently process their critical sections of code.

At least some examples provide an apparatus comprising:

processing circuitry to process threads of data processing; and transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, the transaction memory support circuitry comprising conflict detection circuitry to trigger an abort of the transaction in response to detecting a conflicting access from another thread to one of a working set of addresses tracked for the transaction; in which:

in response to a load-exclusive instruction specifying a given address, the processing circuitry is configured to set an exclusive monitor indication for the given address;

in response to a store-exclusive instruction specifying the given address, the processing circuitry is configured to return a store-exclusive fail indication when the given address no longer has the exclusive monitor indication set;

in response to a predetermined type of load instruction specifying a load target address, which is executed within a given transaction, the processing circuitry is configured to trigger clearing of any exclusive monitor indication previously set for the load target address; and in response to said load-exclusive instruction, at least one of the processing circuitry and the transactional memory support circuitry is configured to trigger an abort of a transaction for which the given address is specified as one of the working set of addresses.

At least some examples provide a data processing method comprising:
in response to a load-exclusive instruction specifying a given address, setting an exclusive monitor indication for the given address;
in response to a store-exclusive instruction specifying the given address, returning a store-exclusive fail indication when the given address no longer has the exclusive monitor indication set;
in response to a predetermined type of load instruction specifying a load target address, which is executed within a transaction, clearing any exclusive monitor indication previously set for the load target address, the transaction comprising instructions of a given thread executed speculatively between a transaction start instruction and a transaction end instruction, for which commitment of results of the speculatively executed instructions is prevented until the transaction end instruction is reached, where the transaction is to be aborted in response to detecting a conflicting access from another thread to one of a working set of addresses tracked for the transaction; and
in response to said load-exclusive instruction, triggering an abort of a transaction for which the given address is specified as one of the working set of addresses.

At least some examples provide a computer program for controlling a host data processing apparatus to provide an instruction execution environment for execution of threads of data processing; the computer program comprising:
processing program logic to process threads of data processing; and
transactional memory program logic to support execution of a transaction within a thread processed by the processing program logic, the transaction comprising instructions of the thread executed speculatively between a transaction start instruction and a transaction end instruction, for which the processing program logic is configured to prevent commitment of results of the speculatively executed instructions until the transaction end instruction is reached, the transaction memory program logic comprising conflict detection program logic to trigger an abort of the transaction in response to detecting a conflicting access from another thread to one of a working set of addresses tracked for the transaction; in which:
in response to a load-exclusive instruction specifying a given address, the processing program logic is configured to set an exclusive monitor indication for the given address;
in response to a store-exclusive instruction specifying the given address, the processing program logic is configured to return a store-exclusive fail indication when the given address no longer has the exclusive monitor indication set;
in response to a predetermined type of load instruction specifying a load target address, which is executed within a given transaction, the processing program logic is configured to trigger clearing of any exclusive monitor indication previously set for the load target address; and
in response to said load-exclusive instruction, at least one of the processing program logic and the transactional memory program logic is configured to trigger an abort of a transaction for which the given address is specified as one of the working set of addresses.

At least some examples provide an interconnect comprising:
a plurality of interfaces to exchange messages with a plurality of processing elements; and
control circuitry configured to manage coherency between the plurality of processing elements; in which:
in response to an exclusive monitor setting message from a given processing element indicating setting of an exclusive monitor indication associated with a given address for tracking exclusive access to the given address, the control circuitry is configured to trigger the interfaces to transmit the exclusive monitor setting message to at least one other processing element; and
in response to a predetermined type of read request received from a first processing element requesting return of a read data value associated with a target address specified by the first type of read request, the control circuitry is configured to trigger the interfaces to transmit an exclusive monitor cancelling message to at least one other processing element to trigger cancellation of any exclusive monitor indication associated with the target address.

Further aspects, features and advantages of the present technique will be apparent from the following description of examples, which is to be read in conjunction with the accompanying drawings, in which:

FIG. 1 schematically illustrates an example of a data processing system having multiple processing elements and an interconnect;

FIG. 3 illustrates an example of processing a transaction in a system with transactional memory support;

FIG. 4 shows an alternative code sequence for executing equivalent operations to the transaction of FIG. 3 in a non-transactional manner using locks;

FIGS. 5-8 show a code example illustrating how the interaction between load/store exclusive instructions and transactions in the presence of load speculation can cause loss of mutual exclusion;

Figure 1:
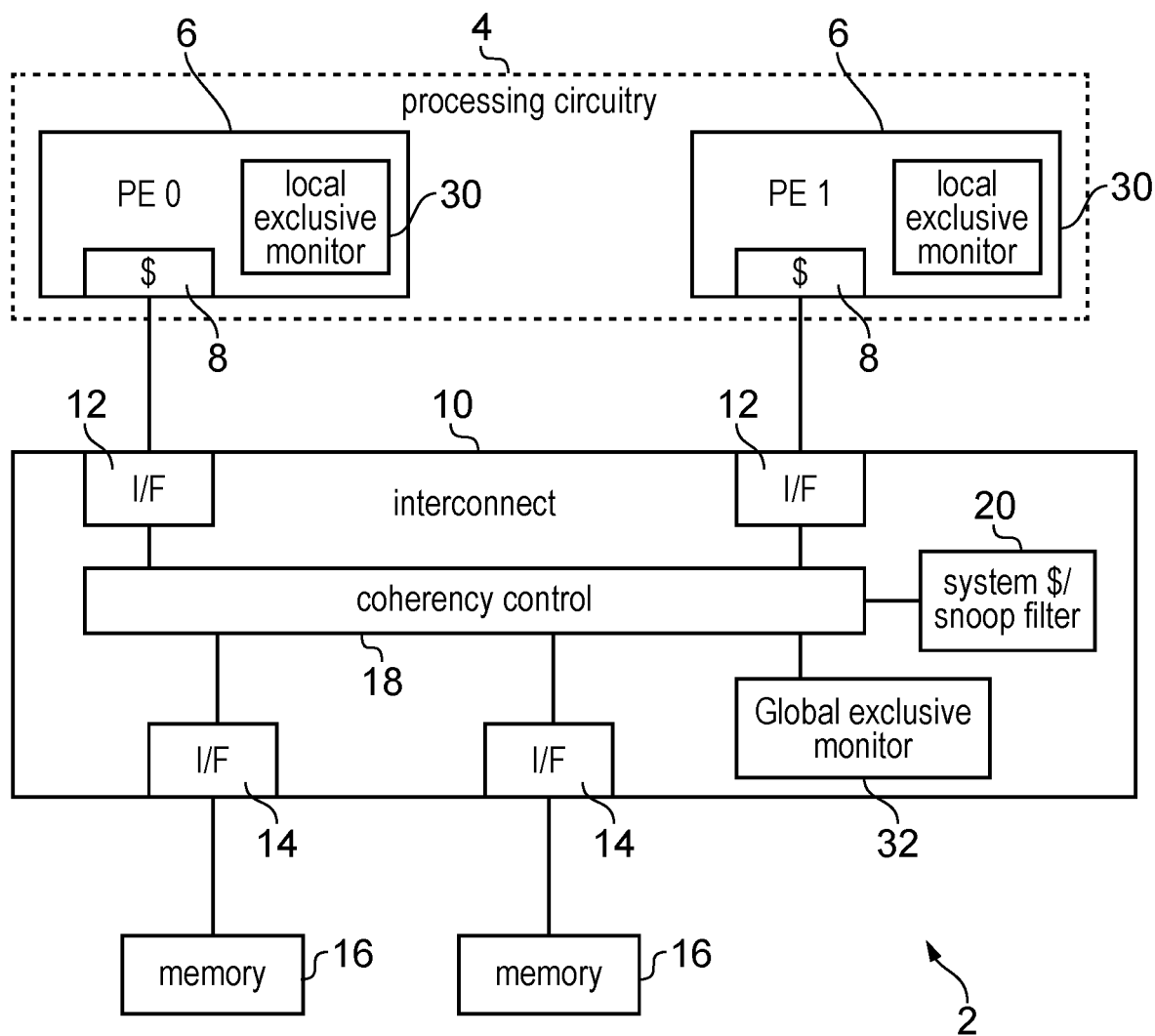

Some specific examples are disclosed below. It will be appreciated that the claims are not limited to these specific examples.

Processing circuitry may have transactional memory support circuitry to support execution of a transaction within a thread processed by the processing circuitry. A transaction comprises instructions of the thread executed speculatively between a transaction start instruction and a transaction end instruction. The processing circuitry may prevent commitment of results of the speculatively executed instructions until the transaction end instruction is reached. The transaction memory support circuitry may include conflict detection circuitry to trigger an abort of the transaction in response to detecting a conflicting access from another thread to one of a working set of addresses tracked for the transaction.

As the transactional memory support circuitry provides for speculative execution of instructions within a transaction so that the speculative results can be unwound if the transaction has to be aborted, it is not necessary to use a lock variable to avoid conflict between two threads executing transactions. However, there may also be some threads which are executing in a non-transaction-based approach. For example such non-transactional threads could be threads executing a section of code which was originally written or compiled without use of transactions (not comprising any transaction start/end instructions). Alternatively, the non-transactional threads may include threads which were previously processing instructions in a transaction-based mode, but for which the transaction encountered frequent abort events (e.g. due to conflict with other threads) and so processing has now been switched to a non-transaction-based mode. For conciseness, the term "non-transactional thread" is used below to refer to either a thread which does not use transactions at all, or to a transactional thread which is currently executing a fallback path selected when a certain number of attempts to execute using a transaction has failed.

If such non-transactional threads need exclusive access to at least one target resource, then often a lock variable may be used to control exclusive access to the at least one target resource. Counter-intuitively, transactional threads may still need to check the lock variable within the transaction-based code path (not just in the fallback code path), because to ensure correct results for any non-transactional threads, a transactional thread should be prevented from committing a transaction which involves a write to the shared resource while a non-transactional thread holds the lock. Therefore, often even within a transaction of a thread executed in a transactional mode, the transaction may still include instructions for checking the lock variable to determine whether any other thread holds exclusive access to a resource, and if the lock is currently held by another thread, deferring subsequent operations, preventing commitment of a transaction, or aborting the transaction.

One way for a non-transactional thread to check and acquire a lock can be to use load-exclusive and store-exclusive instructions. When a load-exclusive instruction is executed specifying a given address, the processing circuitry may set an exclusive monitor indication for the given address. The load-exclusive instruction may also return a value read from a storage location corresponding to the given address. When a store-exclusive instruction specifying the given address is executed, the processing circuitry may return a store-exclusive fail indication when the given address no longer has the exclusive monitor indication set. On the other hand, when the exclusive monitor indication is still set at the time of executing the store-exclusive instruction, then a store operation may be performed to write an updated value to the given address and a store-exclusive success indication may be returned. Various events could trigger a previously set exclusive monitor indication to be cleared, such as another thread executing a store operation to update the data value associated with the given address, or another thread executing another load-exclusive instruction specifying the given address. The tracking of events which require clearing of a previously set exclusive monitor indication may be carried out by the micro-architecture of the data processing system, without requiring explicit instructions to be executed in program code for checking these events. Hence, the non-transactional thread could use a load-exclusive instruction to read a lock variable and set the exclusive monitor, and then a subsequent store-exclusive instruction can attempt to claim the lock by writing an updated value to the lock variable, and may fail if another thread in the meantime has claimed the lock already as in this case the exclusive monitor may no longer be set. The support for load and store exclusive instructions using the exclusive monitor indication can simplify enforcing mutual exclusion between threads.

Hence, some threads may use the exclusive monitor indication used by the load/store-exclusive instructions to enforce mutual exclusion of some resource, to reserve that resource for the current thread so that it can be used atomically without interference from another thread. Other threads may use transactional memory to enforce such mutual exclusion between threads. To ensure correct interaction between transactional and non-transactional threads, a transactional thread may include instructions for checking the lock variable accessed by the load/store-exclusive instructions in a non-transactional thread.

However, the inventors recognised that in some scenarios even if the transaction is arranged to check the lock variable and prevent a write to the shared resource being committed if another thread already holds the lock, this can sometimes result in a loss of mutual exclusion against threads which use load and store exclusive instructions to enforce the mutual exclusion. This is because some micro-architectures may support speculative execution of load instructions before it is known whether that load is really required. Hence in some cases the micro-architecture of the processing circuitry could pull a subsequent load instruction of a non-transactional thread ahead of the instruction which checks whether an earlier store-exclusive instruction has completed successfully. If all threads are non-transactional threads using load/store-exclusive instructions to enforce mutual exclusion, than this is not a problem because eventually if the store-exclusive instruction is determined to fail then the subsequent load instruction which has already been speculatively executed will be determined to have been incorrectly executed and any results of that load can be discarded.

However, if there are also other threads executing using transactions to enforce the mutual exclusion, it is possible that the transaction could start and end within the period between the younger load executed speculatively out of turn and the older store-exclusive instruction which sets the lock. In this event, it is possible that the mutual exclusion could be lost because the transaction would not detect the action of the non-transactional thread as the lock had not yet been claimed by the non-transactional thread when the transaction was executed, but also the non-transactional thread would not detect the transactional thread as the transactional thread would not typically claim the lock itself unless it resorts to the lock-based fallback code path. The speculative execution of the younger load would therefore be allowed to be committed, and may cause the non-transactional thread to use the stale value of the shared resource which was present before the transaction was executed, rather than the updated value provided by the transaction. Hence, the effect of the transaction may effectively be lost and there may be a violation of mutual exclusion.

One possible way of mitigating against this problem may be to include a speculation barrier instruction within code associated with a non-transactional thread. The speculation barrier instruction may require that the micro-architecture of the processing circuitry is not allowed to execute any instruction which follows the barrier instruction until all of the earlier instructions preceding the barrier have completed.

By including the barrier after the store-exclusive instruction for claiming the lock, and before the subsequent load instruction which loads the shared data associated with the critical section of code, this prevents speculative hoisting of the subsequent load ahead of the store exclusive instruction, so that the result of the store-exclusive instruction is known before any value associated with a critical section of code has been read. This means that even if a transactional thread starts a transaction using the same shared resource and the transaction completes before the store-exclusive instruction is resolved, the subsequent load of the non-transactional thread will load the value resulting from the completion of the transaction rather than the value present before the transaction has executed, to maintain mutual exclusion.

However, a problem with including such barriers is that this can reduce performance of non-transactional threads, since in cases when there is no conflict with a transactional thread, the later load may have been prevented from being speculatively executed at an earlier timing, which can reduce performance by delaying access to memory unnecessarily. Also, rewriting code to include such additional barrier instructions may result in a relatively high software development and distribution overhead. For example, legacy code written for a system which had no transactional memory support, which was written using load and store exclusive instructions to enforce mutual exclusion, could no longer safely execute on a system supporting transactional memory and so such code would need to be rewritten to include the barrier, which may be undesirable.

A way to avoid needing speculation barriers is to provide a predetermined type of load instruction which, when executed in a given transaction specifying a load target address, triggers the processing circuitry to trigger clearing of any exclusive monitor indication previously set for the load target address in response to a load-exclusive instruction. In comparative systems implementing load/store exclusives, loads to an address for which an exclusive monitor indication has been set would not typically result in clearing of the exclusive monitor, since the load would not be expected to change the value of the data at the address associated with the exclusive monitoring indication, and so would not be deemed at risk of disturbing the exclusivity of access to the address tracked by the exclusive monitor. However, by clearing the exclusive monitor indication when a predetermined type of load is executed within a transaction, this means that even if the transaction executes before the store-exclusive instruction has been executed to claim a lock in a non-transactional thread, the non-transactional thread can detect the intervening action of the transaction, preventing loss of mutual exclusion (as the resulting failure of the store-exclusive instruction would prevent the non-transactional thread proceeding with the critical section using a stale value of the shared resource, even in the case where a load from the critical section has been speculatively executed already).

Also, in response to a load-exclusive instruction, the processing circuitry and/or the transactional memory support circuitry may trigger an abort of a transaction for which the given address specified by the load-exclusive instruction is specified as one of the working set of addresses associated with the transaction. This means that even if the relative timing between the transactional thread and the non-transactional thread is such that the transaction starts before the load-exclusive instruction is executed in the non-transactional thread and load speculation is performed in the non-transactional thread which could result in the load of the shared variable being performed speculatively before the transactional thread has updated the shared variable, by aborting the transaction the update of the shared variable for the transactional thread is prevented from taking place, to ensure mutual exclusion. The transaction may later be retried once the update made by the critical section in the non-transactional thread has already been carried out.

Hence, regardless of the relative timing between the execution of the load/store-exclusive instructions in a non-transactional thread and the transaction in a transactional thread, mutual exclusion can be enforced even if some load instructions are speculatively executed out of turn. This allows safe interworking between threads relying on exclusive monitor indications and threads using transactions, without requiring the non-transactional code to be rewritten to include additional barriers.

The technique discussed in this application could be used in apparatus which has a single processing element. For example, the single processing element could process multiple threads of data processing in a time share manner, or could use simultaneous multi-threading (SMT) in which instructions from multiple threads are present in the processing pipeline at the same time, with partitioned register sets tracking the architectural state for multiple threads simultaneously.

However this technique is particularly useful in a system where the processing circuitry includes multiple processing elements (e.g. processor cores, CPUs or GPUs) which can execute multiple threads of processing in parallel. In a system with multiple processing elements, it is possible that one processing element could be executing a transactional thread in parallel with another processing element executing a non-transactional thread. In this case, the types of conflict as discussed above and the potential loss of mutual exclusion caused by speculation within the non-transactional thread could be more likely, and can be mitigated against by the technique discussed above.

In a system where the processing circuitry has two or more processing elements, then when the load-exclusive instruction is executed on a given processing element, the given processing element may trigger transmission of a message to at least one other processing element, the message indicating that the exclusive monitor indication was set for the given address specified by the load-exclusive instruction. Typically in systems supporting exclusive monitors, while events requiring the clearing of an exclusive monitor indication might be broadcast to other processing elements within a multiprocessor system, it would be unusual to broadcast the setting of an exclusive monitor indication to other processing elements. However, by transmitting a message indicating that the exclusive monitor indication is set to at least one other processing element, this allows a transaction executing on another processing element which has the given address in its working set of addresses to be aborted as discussed above.

In some implementations the message indicating that the exclusive monitoring indication was set could be broadcast to all other processing elements other than the given processing element which executed the load-exclusive instruction. However, in other cases it may not be necessary to transmit the message to all of the other processing elements. For example some processing elements may not have the transactional memory support circuitry and so cannot execute transactions, in which case it is not necessary to send the message to such processing elements. Also, in some cases an interconnect connecting various processing elements could include a snoop filter or other logic to track which processing elements are executing transactions or which addresses are cached/accessed by processing elements, and so it may be possible to determine from data held within the interconnect whether a given address could be within the working set of addresses tracked for a transaction on a given processing element, in which case the exclusive monitor cancelling message could be omitted for processing elements which are not currently processing any transaction or which can be determined from the logic in the interconnect to have a working set of addresses which does not include the given address.

Similarly, when the predetermined type of load transaction is executed on a given processing element, the given processing element may trigger transmission of a message to at least one other processing element to indicate that any exclusive monitor indication previously set by at least one other processing element for the load target address should be cleared, to ensure that the mutual exclusion is maintained across processing elements even in the presence of load speculation performed for a non-transactional thread.

In response to the predetermined type of load instruction executed within the given transaction, the processing circuitry may add the load target address to the working set of addresses for the given transaction. This means that, if a non-transactional thread subsequently attempts to execute a load-exclusive instruction to set an exclusive monitor for the same address, then the transaction is aborted to maintain mutual exclusion.

In some examples, the tracking of the working set of addresses may include separate tracking of a read set of addresses (representing addresses read by the transaction), and a write set of addresses (representing addresses written to by the transaction). For example, the read/write sets of addresses could be tracked by setting flags in a cache indicating whether associated cache lines are part of the read set or write set respectively for a given transaction. In an implementation with separate tracking of read and write sets, the predetermined type of load may trigger adding the load target address to the read set of addresses, and the execution of a load-exclusive instruction may trigger aborting a transaction for which the given address specified by the load-exclusive instruction is within the read set tracked for that transaction.

The execution of the predetermined type of load instruction may also cause an abort of other transactions which have the load target address specified within its write set. Other transactions which have the load target address specified in its read set may continue unaborted following execution of the predetermined type of load instruction. In practice, the expected use case for the predetermined type of load instruction may be to read the lock variable used by non-transactional threads, so it is unlikely the transactional threads will need to write to the lock variable (unless falling back to a non-transactional fallback path), so it is unlikely that the address of the predetermined type of load instruction would be within the write set tracked for a transaction. Hence, where multiple transactions are each reading the same lock variable, the multiple transactions can be processed in parallel without a read of the lock variable causing an abort of another transaction, to allow for parallel processing of the transactions without unnecessary serialisation of the transactions introduced as a consequence of the checking of the lock variable.

In addition to the predetermined type of load instruction, the processing circuitry may also support a second type of load instruction which when executed within the given transaction triggers a processing circuitry to retain any exclusive monitor indication previously set for the load target address. By distinguishing different types of load instructions, this avoids every load in a transaction causing a previously set exclusive monitor to be cleared, which could lead to loss of performance as it would lead to more frequent failure of store-exclusive instructions. While clearing the exclusive monitor in response to a load can be useful for loads of a lock variable to guard against potential loss of exclusion caused by load speculation when interworking transactional and non-transactional threads as discussed above, for other load operations it may be preferred to retain the exclusive monitor as a read to a value is not in itself enough to disrupt the exclusivity of access indicated by the exclusive monitor (as the read would not change the stored data value at the address associated with the exclusive monitor). For example, the predetermined type of load instruction could be used for the part of the code within a transaction that accesses the lock variable used by other non-transactional threads to govern access to the shared resource, while the second type of load instruction could be used in the critical section of code which has to be executed atomically, for a load within a transaction which actually loads the data of interest from the shared resource.

The processing circuitry executing the load and store exclusive transactions may support a given thread speculatively executing a load instruction for loading a data value from a target address before the processing circuitry has resolved whether a lock variable for controlling exclusive access to the target address has been successfully claimed by the given thread. In other words the load speculation may result in the load instruction being executed before resolution of a conditional instruction which evaluates whether a store-exclusive instruction has executed successfully. Such load speculation can improve performance. The approach discussed above can ensure that even if such speculation is performed, non-transactional and transactional threads may still achieve mutual exclusion.

The transactional memory support circuitry may have a number of forms. Various abort events may cause the conflict detection circuitry to trigger an abort of a transaction before its transaction end instruction is reached. One example can be when the conflict detection circuitry detects a conflicting access from another thread to one of the working set of addresses tracked for the transaction of a first thread, which may trigger the transaction of the first thread to be aborted. Other events which could lead to transactions being aborted could include: the execution of a type of instruction which is not allowed to be executed within a transaction; the occurrence of an exception event or interrupt; or the execution of a load-exclusive instruction specifying an address within the working set of addresses as discussed above.

The transactional memory support circuitry may, in addition to the conflict detection circuitry, also include other elements. For example the transactional memory support circuitry could include speculative result storage circuitry to store results of speculatively executed instructions for at least one transaction, and/or restoration state storage circuitry to store architectural state captured in response to the transaction start instruction of a transaction, which can be restored if the transaction is aborted. For example, the speculative result storage circuitry could buffer results of store instructions until the transaction is committed in response to the transaction end instruction, so that the speculatively executed store instructions within the transaction do not pollute the memory system until it is known that the transaction can be committed. The restoration state storage circuitry could for example include registers within a register bank for retaining a checkpoint of state present at the start of the transaction in case the state needs to be rewound to that earlier point of execution when the transaction is aborted. Alternatively, the restoration state could be maintained using register renaming to track old checkpointed architectural state within the same register file as the registers storing the current architectural state.

Another possible reason for aborting the transaction may be if the transactional memory support circuitry runs out of resources so that it is no longer possible to guarantee that the transaction will proceed correctly without conflict. For example, if the number of speculative results to be stored in the speculative result storage circuitry exceeds the capacity available within the storage provided, then a transaction could be aborted.

On aborting a transaction, it may be up to software to determine whether to try to execute the transaction again, or to use a non-transactional fallback path instead (e.g. using locks and load/store-exclusive instructions). However, the micro-architecture of the processing circuitry could provide hints to indicate a possible reason of the abort of the transaction, which could be used by the software to determine whether it is worth attempting to execute the transaction again or to use the fallback path (e.g. if the cause of the abort is such that any future attempt would be likely to fail).

A corresponding computer program may be provided for controlling a host data processing apparatus to provide an instruction execution environment for execution of threads of data processing, the computer program comprising processing program logic to process threads of the data processing and transactional memory program logic to support execution of a transaction within a thread processed by the processing program logic (in a similar way to the support for transactions discussed above for a hardware embodiment). The transactional memory program logic may comprise conflict detection program logic for triggering a transaction to be aborted when a conflicting access from another thread to one of the working set of addresses tracked for the transaction is detected. The program logic of the computer program may respond to the execution of load/store-exclusive instructions and to the predetermined load instruction in a similar way to the corresponding processing circuitry and transactional memory support circuitry as discussed above.

Hence, a computer program may be provided which presents, to software executing above the computer program, a similar instruction environment to that which would be provided by an actual hardware apparatus having the features discussed above, even though there may not be any actual hardware providing these features in the host computer executing the computer program. Instead the computer program, which may for example be a simulator or a virtual machine, may emulate the functionality of the hardware architecture by providing program logic (such as sets of instructions or data structures) which enables a generic host data processing apparatus to execute code intended for execution on an apparatus with transactional memory support, in a manner compatible with the results that would be achieved on the apparatus with transactional memory support.

An interconnect may also be provided which has a number of interfaces to exchange messages with respective processing elements, and control circuitry to manage coherency between the processing elements. In response to an exclusive monitor setting message from a given processing element indicating setting of an exclusive monitor indication associated with a given address for tracking exclusive access to the given address, the control circuitry may trigger the interfaces to transmit the exclusive monitor setting message to at least one other processing element. In response to a predetermined type of read request received from a first processing element requesting return of a read data value associated with a target address specified by the first type of read request, the control circuitry may trigger the interfaces to transmit an exclusive monitor cancelling message to at least one other processing element to trigger cancellation of any exclusive monitor indication associated with the target address.

Hence, while conventional interconnects would not normally broadcast the setting of an exclusive monitor indication to other processing elements, by doing so this enables other processing elements executing a transaction with the given address in its read set to abort the transaction to ensure mutual exclusion even if the non-transactional thread which set the exclusive monitor indication uses load speculation to execute a load to a shared resource out of turn. Also, the predetermined load instruction executed at a given processing element may trigger the given processing element to issue the first type of read request, which causes the interconnect to forward the exclusive monitor cancelling messages to other processing elements, again helping to maintain mutual exclusion between non-transactional and transactional threads.

FIG. 1 schematically illustrates an example of a data processing system 2 having processing circuitry 4 supporting the execution of a number of threads of data processing. In this example the processing circuitry 4 includes a number of independent processing elements 6 which can each perform execution of a respective thread of processing in parallel with each other. Each individual processing element 6 may for example be a central processing unit (CPU), graphics processing unit (GPU) or any other programmable unit capable of executing instructions. Each processing element may have at least one cache 8 for caching data from a memory system 20, 16, where accessing data in the cache 8 requires less latency than accessing the data from the memory system.

An interconnect 10 is provided to manage communication between the processing elements 6 and to manage coherency between the data in the respective caches 8 of the processing elements 6. The interconnect 10 has a number of interfaces 12 for communicating with the individual processing elements 6, as well as memory device interfaces 14 for communicating with memory devices 16 such as DRAM or non-volatile memory. The interconnect 10 has a coherency control unit 18 for tracking read or write requests for data by the processing elements 6 and responding with requests for maintaining coherency, e.g. the coherency control circuitry 18 may control the interconnect 10 to respond to a read or write request by sending snoop messages to other processing elements which query the state of data cached in the local cache 8 of the other processing elements, and/or which request return and/or invalidation of cached data for the corresponding address. For example when one processing element attempts to read data into its cache in a unique state in which that data can be written to without issuing further requests for the interconnect, then the coherency controller 18 may check whether other processing elements hold that data and invalidate it from other processing elements 8 if necessary. In some cases a snoop filter and/or system cache 20 may be provided within the interconnect. If a system cache is provided, it may cache data from the memory 16 for faster access than if it has to be fetched all the way from memory (but with longer latency than if the data is in the local cache of a processing element 8). A snoop filter may partially or completely track what data is cached in each processing element's cache 8, so that the number of coherency messages that need to be sent can be reduced (e.g. snoop requests can be omitted for a given processing element if it is known that the processing element does not hold the required data). In some cases, the system cache and the snoop filter may be implemented using a common storage structure (e.g. with the snoop filter being represented by tracking bits associated with each cache line of the system cache 20 indicating whether the data is also cached in each processing element's cache 8). Any known coherency protocol may be used by the interconnect 10 to manage the coherency between the processing elements. For example, the AMBA® ACE or CHI protocols provided by Arm® Limited of Cambridge, UK, could be used.

Figure 2:
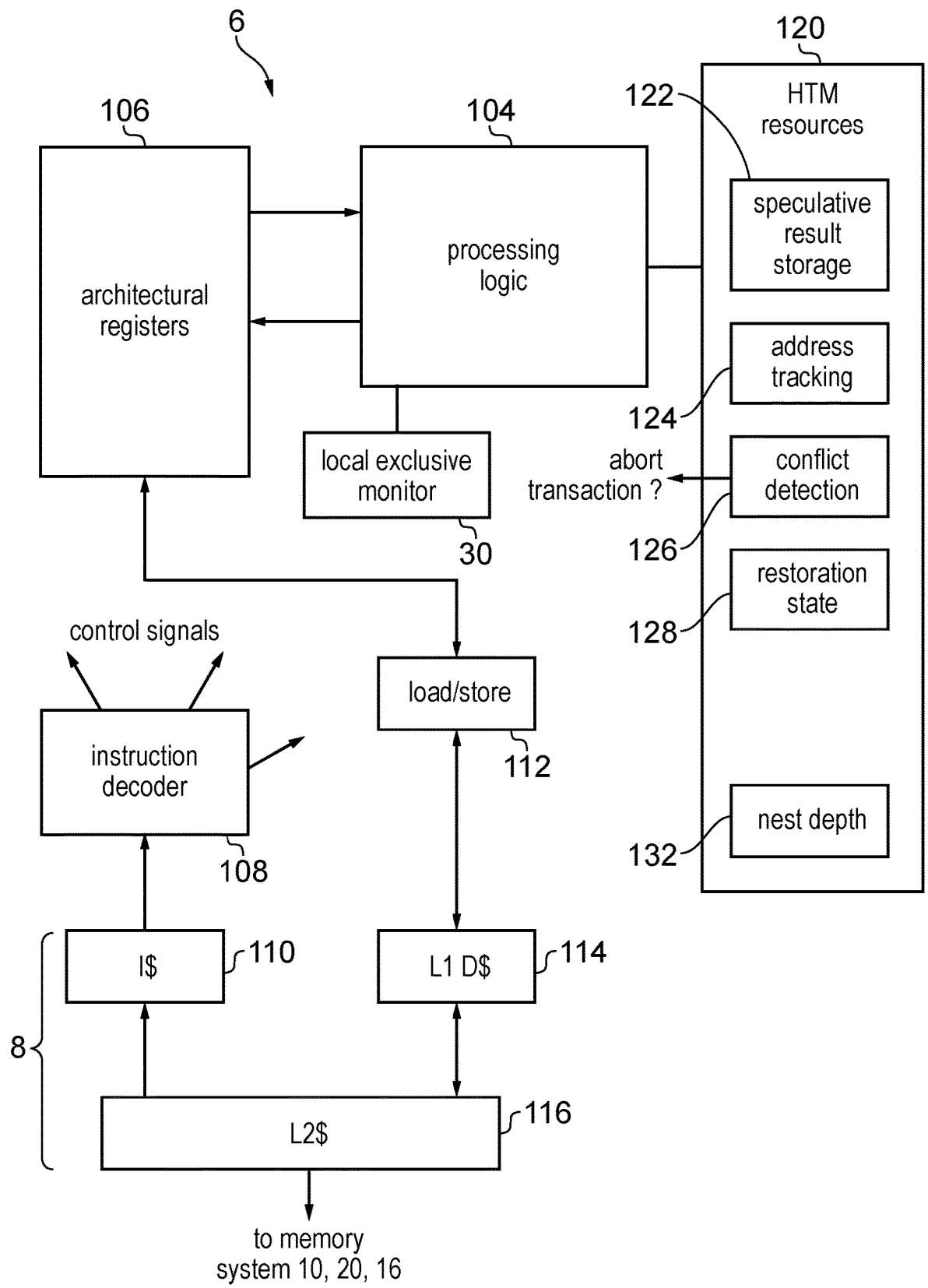
FIG. 2 shows an example of a processing element comprising transactional memory support circuitry.

FIG. 2 shows an example of a portion of one of the processing elements 6 in more detail. The processing element 6 has processing logic 104 for executing instructions to carry out data processing operations. For example the processing logic 104 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 106 is provided for storing operands for the instructions executed by the processing logic 104 and for storing the results of the executed instructions. An instruction decoder 108 decodes instructions fetched from an instruction cache 110 to generate control signals for controlling the processing logic 104 or other elements of the data processing apparatus 102 to perform the relevant operations. A load/store unit 112 is also provided to perform load operations (in response to load instructions decoded by the instruction decoder 108) to load a data value from the level 1 or level 2 caches 114, 116 or main memory 16 into the architectural registers 106, and store operations (in response to store instructions decoded by the instruction decoder 108) to store a data value from the architectural registers 106 to the caches 114, 116 or main memory 16. Note that the local cache 8 shown in FIG. 1 could correspond to any of the level 1 instruction and data caches 110, 114 or the level 2 cache 116 of FIG. 2.

The apparatus 102 also has transactional memory support circuitry 120 which provides various resources for supporting hardware transactional memory (HTM). The HTM resources in the transactional memory support circuitry 120 may include for example speculative result storage 122 for storing speculative results of transactions, address tracking circuitry 124 for tracking the addresses accessed by a transaction, conflict detection circuitry 126 for detecting conflicts between data accesses made by a transaction and data accesses made by other threads, so that a transaction can be aborted when a conflict is detected, and restoration state storage circuitry 128 for storing a snapshot of the architectural state data from the architectural registers 106 at the start of a transaction, so that this state can be restored to overwrite the speculative results of the transaction when a transaction is aborted. Although the address tracking circuitry 124 is shown as a separate component in FIG. 2, in some instances it could be implemented using metadata in each cache line of the level 1 or level 2 cache 114, 116 which tracks whether a given address has been read or written to in a transaction. In some cases, separate read and write sets of addresses could be distinguished for a given transaction by the address tracking circuitry 124.

Also the resources may include a nesting depth register 132 for storing a nesting depth value tracking a level of nesting of transactions. It can be useful for a programmer or compiler to be able to define nested transactions (where a second transaction start instruction is encountered after a first transaction start instruction, but before the transaction end instruction corresponding to the first transaction start instruction). This can be useful to ensure that a critical section of code is treated atomically even if there is a branch into a part of the code beyond the first transaction start instruction. However, to avoid having to capture multiple checkpoints of architectural state in the speculative result storage, some microarchitectures may effectively ignore the "inner" transactions of a nested set of transactions, and only capture a checkpoint of an architectural state in response to the very first transaction start instruction. Any subsequent transaction start instruction arising before the transaction end instruction may effectively be ignored, except that the nesting depth register 132 may be incremented to track how many transaction start instructions have been encountered, so that on encountering the transaction end instructions, the micro-architecture can track which transaction end instruction relates to the outer transaction of the nested set of transactions. Hence, when encountering a transaction end instruction, if the nesting depth is one or more, then the transaction end instruction is ignored, and if the nesting depth is zero (indicating that the transaction is the outer transaction of a nested set), the transaction may be committed.

FIG. 2 shows an example of a processing element having transactional memory support circuitry 120. In some cases, several processing elements 6 of the system 2 shown in FIG. 1 may have such transactional memory support circuitry 120. However, it is not essential for all processing elements 6 to have the transactional memory support circuitry—there may be some processing elements not capable of executing transactions. Also, although FIG. 2 shows the transactional memory support circuitry 120 within the micro-architecture of an individual processing element 6, this is not essential. In some cases, some transactional memory resources could be shared between processing elements—e.g. some common storage for capturing restoration state 128 or tracking addresses 124 could be provided which can be shared for use between multiple processing elements.

FIG. 3 shows an example of executing a transaction within a given thread using the transactional memory support circuitry 120 and the processing logic 104. A transaction is a section of program code which is bounded by a transaction start instruction (tstart) and a transaction end instruction (tcommit). As shown in FIG. 3, in response to the transaction start instruction, the current architectural state in the architectural registers 106 is captured and stored in the restoration state storage circuitry 128 (for nested transactions, only the outer transaction of the nested set of transactions may trigger the capture of architectural state). The processing logic 104 begins to perform speculative execution of the subsequent instructions following the tstart instruction, and as these instructions are executed, the addresses accessed by those instructions are tracked by the address tracking circuitry 124, and the conflict detection circuitry 126 detects conflicts between the tracked addresses and addresses of made accesses using the load/store unit 112 in response to other threads. At least some speculative results of the instructions within the transaction are stored within the speculative result storage circuitry 122. For example the value stored the cache or to memory in response to a store instruction STR may be held in the speculative result storage 122 while the transaction remains pending. If the transaction end instruction (tcommit) is reached without an abort event occurring in the meantime, then in response to the transaction end instruction the speculative results are committed. On committing the transaction, any results stored in the speculative results storage 122 for that thread may be written to the data cache 114 or memory 116 and the restoration state 128 can be discarded or permitted to be overwritten as it is no longer needed to rewind architectural state to the point before the transaction start instruction was encountered.

On the other hand, if an abort event occurs, for example when a conflict is detected by the conflict detection circuitry 126 when another thread accesses an address already accessed by the transaction, then an abort of the transaction is triggered and the restoration state from the restoration state storage 128 is restored to the architectural registers 106. Other causes of an abort event could for example include execution of an instruction which is not allowed to be executed within a transaction, insufficient resource within the speculative result storage 122 or an address tracking circuitry 124 for handling the speculative results or addresses required by a given transaction, or an interrupt being received during the transaction.

FIG. 3 shows how a certain set of processing operations may be performed in a transactional mode using the transaction start and end instructions. Another way of managing locks for non-transactional threads may be to use exclusive monitors. The processing circuitry 4 may support the use of load-exclusive and store-exclusive instructions which can be used to ensure that a process does not proceed to subsequent sections of code unless no other process has interacted with a given address between the execution of the load exclusive instruction and the execution of the store-exclusive instruction. In response to execution of a load-exclusive instruction, the processing element 6 which executed the load-exclusive instruction triggers the setting of an exclusive monitor indication associated with the target address of the load-exclusive instruction. As shown in FIG. 1, this exclusive monitor indication could be held within a local exclusive monitor 30 provided within the processing element itself or within a global exclusive monitor 32 provided within the interconnect. For example a local exclusive monitor 30 could be used if the address specified by the load-exclusive instruction is a non-shareable address which is guaranteed not to be accessed by other processing elements, while the global exclusive monitor 32 could be used for sharable addresses which could be accessed by multiple processing elements 6. In some implementations it may not be necessary to provide both local and global exclusive monitors 30, 32 and the functions of these could be combined.

The exclusive monitor indications set for the target address of the load-exclusive instruction may be any indication which allows the local/global exclusive monitor 30, 32 to detect that it should monitor for events which could indicate that exclusive access to that specific address can no longer be guaranteed, such as store operations to the same address triggered by other threads or other processing elements, or the execution of a further load-exclusive instruction to the same address by another thread or another processing element. In some examples, a storage structure indexed per block of addresses could have a flag set for each block indicating whether an exclusive monitor has been set for that block. However, in practice the number of addresses for which exclusive monitors may need to be set may be relatively low, so a more efficient implementation could be simply to provide one or more registers storing the addresses of the locations for which the exclusive monitor indication has been set.

The interconnect 10 may, on detecting an event which could indicate that there is no longer a guarantee of exclusive access to a given address, transmit messages indicating that such events have occurred to each processing element so that if any exclusive monitor has been set for the relevant address then this can be cleared. The precise detail of how the exclusive indications are managed may be an aspect of the specific microarchitecture chosen for a specific processor implementation. Hence in general, the architecture may specify that a number of events should trigger clearing of the exclusive monitor, but the precise way in which this is signalled by the interconnect 10 or tracked within the exclusive monitor logic 30, 32 may vary.

When a store-exclusive instruction is executed by a given processing element 6, the processing element 6 may check whether the exclusive monitor indication previously set for the required address of the store-exclusive instruction is still set, and if so then the store instruction may execute successfully to store data to a given memory address and the processing element may also return a store-exclusive success indication, such as setting a flag in a register to confirm that the store was completed correctly. A subsequent conditional instruction can then check the store-exclusive success indication to determine whether to proceed with subsequent code which uses a resource for which exclusive access is required. Hence, by executing a load and store exclusive pair specifying an address used to provide a lock variable, this can provide a way of guaranteeing atomic access to some subsequent section of code in non-transactional threads. If the store exclusive instruction is executed when the exclusive monitor indication has already been cleared then a store-exclusive fail indication is returned, which can lead to a subsequent conditional instruction failing its condition codes, preventing the program flow proceeding beyond that conditional instruction so that the critical section of code is not entered when exclusive access to the earlier resource cannot be guaranteed.

In some cases the exclusive monitor logic 30, 32 may only have resources for tracking a limited number of addresses simultaneously as having exclusive monitor indications set. For example in some implementations the exclusive monitor indication could simply comprise an indication of a single address for which the exclusive monitor indication is deemed to be set, and if another load-exclusive instruction is executed specifying a different address then this may clear any previously set indication for an address specified by an earlier load-exclusive instruction.

Hence, some threads of processing being executed by the processing circuitry 4 may use the transactional mode as shown in FIG. 3 to enforce mutual exclusion to some range of addresses, while other threads may use a lock-based mode using load and store exclusive instructions to enforce the atomic access without using transactions. For example, FIG. 4 shows an approach of setting a lock at the start of the critical section of code and then releasing the lock once the critical section is complete (load/store-exclusive instructions could be used to handle the reading and claiming of the lock at step 140 of FIG. 4). For example there may be some processing elements 6 which do not have the hardware transactional memory resources 120 and so are restricted to using the lock-based approach, while other processing elements 6 may have the hardware transactional memory resources 120. Also, threads which were initially attempted using the transactional mode may, if frequent aborts occur for those transactions, switch to using a non-transactional mode using locks. For example there may be a set of threads which keep encountering conflicts and so it is not efficient to continue to use transactions for all of those threads. Hence, even while one thread is using a transactional mode similar to the one shown in FIG. 3, there may still be other threads which need to use a lock-based mechanism. Also, the threads which operate in the transactional mode may still need to access the shared resources which are also accessed by the non-transactional threads. In some cases, the non-transactional threads may actually be executing the same code as the transactional threads, but the code may have both transactional and non-transactional paths within the code, which may be selected depending on whether the transactions have been found to be efficient on previous occasions (for example the software may switch to a non-transactional path if the transactional path keeps aborting).

As there may be both transactional and non-transactional threads which need to share access to a resource guarded by a lock, then sometimes a transactional thread may still need to have some instructions which read the lock address, and abort the transaction or wait for a period of time if the lock is currently claimed or set. While such lock checking instructions would not be required to ensure the correct processing of the transactional thread itself, since the conflict checking circuitry 126 will be able to detect if another thread conflicts with the transaction and if so to abort the transaction to prevent incorrect results, the lock checking would be required to prevent committing of results of a transaction at a time when another thread holds the lock, which could compromise the operation of a non-transactional thread.

The processing circuitry 4 may also support speculative execution of instructions, where some instructions are executed before it is known whether they should really of executed at all, or whether the inputs to the instruction are correct. For example a given processing element may have a branch predictor to predict the outcome of a conditional branch instruction before that outcome is actually determined (the branch outcome could depend on values loaded from the memory system or results of earlier instructions which are not available yet), and later instructions can be executed based on a predicted outcome. If the branch is correctly predicted then this can improve performance, but if there is a misprediction then the results of any speculatively executed instructions can be discarded and architectural state in the registers 106 can be rewound to the point of the branch, and the subsequent instructions associated with the correct branch outcome can then be executed. The latency penalty associated with resolving mispredictions can be outweighed by the gain in performance in enabling instructions to be fetched, decoded and executed sooner in cases where the prediction is correct. Sometimes such speculative processing may result in a load instruction for loading data from the memory system 8, 20, 16 being executed before an earlier conditional branch has been resolved which governs whether that load should actually have been executed. In cases where this branch is mispredicted, this can cause problems in the interaction between a transactional thread and a non-transactional thread using load/store-exclusive instructions, potentially causing a loss of mutual exclusion. The following example is given to illustrate this problem.

Consider two processing elements (P0 and P1) each performing an operation on a certain variable x, for which mutual exclusion is required:

| P0 | P1 |
|---|---|
| lock( ) | lock( ) |
| x: = x + 2 | x := 1 |
| unlock( ) | unlock( ) |

If x initially has a value of 0, then the final result for x is expected to be either:
 1, if P0's update is performed first, and then P1 acts on the value of x resulting from P0; or
 3, if P1's update is performed first, and then P0 acts on the value of x resulting from P1.

A final result of 2 would be a violation of mutual exclusion, as it would imply that P0 read the current value of x after P1 had started processing x but before P1 had written the new value of x back to memory. It will be appreciated that this example is contrived and in practice the processing operation performed by each thread of processing on a shared data resource may be more complex. However, this simplified example is useful for explaining the problem.

FIG. 5 shows a "spinlock" code example showing a potential implementation for the thread performed on processing element P0, where a load/store exclusive instructions LDAXR, STXR are used to check whether the lock is currently claimed and to claim the lock if no other thread has claimed the lock (the exclusive monitor logic 30 detecting instances when another thread claims the lock in the period between the load exclusive and store exclusive instructions), and hence whether it is safe to proceed with the processing using the shared "x" variable.

FIGS. 6 and 7 show a code example showing an alternative implementation where transactions are used in an attempt to elide the lock. FIG. 7 shows in more detail the functions CHECK, WAIT_ACQ, LOCK, CHECK_ACQ and UNLOCK shown in FIG. 6. Note that the code shown in FIG. 6 includes both the code for starting and committing a transaction, but also a fallback code path (labelled "fallback:") for retrying the transaction if another thread holds the lock at the time of performing the transaction, and a locking path (labelled "lock:") to be executed if elision fails (if the transaction has already been retried unsuccessfully a certain number of times). As shown in FIG. 7, the locking path in the function LOCK(Xx) uses the load/store exclusive instructions in a similar way to the example shown in FIG. 5. Note also that in FIG. 6, in the event the use of the transaction is successful (no other process held the lock), then the code shown in FIG. 6 will enter the critical section labelled "enter:" without ever having claimed the lock itself (while the lock address is added to the transaction's working read set at CHECK(X1), the lock is not written to unless the locking path is executed in the event of the transaction failing).

As shown in FIG. 8, a processing element P0 executing the spinlock code of FIG. 5 may perform load speculation to execute some load instructions before it is known whether the load should actually be executed. This can result in the load instruction which loads the shared variable x (which should not execute if the lock has not been acquired) being executed before resolution of the conditional branch which tests whether the store exclusive instruction was successful (i.e. sometimes the load of the shared variable "x" may be performed before the lock has actually been acquired). If all processing elements were using the same mechanism (load/store exclusive instructions) to ensure mutual exclusion, this would be acceptable, as if the store exclusive instruction is later determined to have been unsuccessful, i.e. the conditional branch instruction CBNZ of FIG. 8 should have been taken, then the mechanisms provided for resolving incorrect speculation would cancel the effects of the load of the shared variable "x" and any subsequent instructions, and reset processing based on the correct branch outcome, as if the load of the "x" variable had never been performed. This would ensure that the loop would be attempted again, so that if any other thread has updated the "x" variable in the meantime, the current thread shown in FIG. 8 would read the latest value for "x" and the result of the current thread would only be committed to architectural state in the event that the store exclusive instruction STXR is successful, i.e. no other thread caused the exclusive monitor set in response to the LDAXR instruction to be cleared before the STXR instruction was executed to claim the lock.

However, if processing element P0 processes the critical section using the load/store-exclusive instructions, while processing element P1 processes the critical section using a transaction to elide the lock, the speculative execution of the load of the "x" variable out of turn by processing element P0 can cause a violation of mutual exclusion, e.g. if the relative timing of the instructions executed by P0 and P1 are as follows:

P0 executes the LDAXR of the lock variable (seeing 0=free), and sets the exclusive monitor indication for the lock variable address P0 executes the LDR of the x variable (seeing 0)

. . .

P1 executes a TSTART and a LDR of the lock variable (seeing 0=free)

P1 executes the STR of the x variable (setting it to 1)

P1 executes a TCOMMIT and succeeds

. . .

P0 executes the STXR of the lock variable (setting it to 1), and the store-exclusive is successful because no intervening write to the lock variable has cleared the exclusive monitor indication set for the lock variable address reservation P0 executes the STR of the x variable (setting it to 2)

P0 executes the STLR of the lock variable (setting it to 0)

This sequence violates mutual exclusion because the final value of x is 2. The mutual exclusion violation is possible because the elided (transactional) path never writes to the lock variable, so the exclusive monitor set by the spinlock code remains intact. Load speculation can hoist a critical section load ahead of the lock store by P0, and so if the transaction on P1 both starts and finishes before the lock is stored to by P0, the value for "x" loaded by P0 is stale (out of date) in the critical section.

One way of addressing this problem could be to introduce a speculation barrier into the non-transactional spin lock code to prevent the load being hoisted above the earlier conditional branch. However this may require many programs already written for systems not supporting transactional memory to be rewritten, which would be an unjustified burden on software developers.

An approach which can ensure backwards compatibility with legacy code written for systems not the supporting transactional memory can be to introduce two additional measures in the architecture to ensure compatibility between transactional and non-transactional threads. Firstly, when a load-exclusive instruction is executed on one processing element 6, the setting of the exclusive indication for the address specified by the instruction is broadcast to other processing elements (at least the processing elements which have the HTM resources 120) so that any transaction which specifies the same address in its working set (read set) of addresses is aborted. Secondly, a new class of transactional load instruction, referred to as the predetermined type of load instruction below, is introduced which when executed within a transaction loads the address specified by the load instruction into the transaction's read set of working addresses, and sends a signal to the interconnect 10 which requests that any previously set exclusive monitor indication for the same address is cleared. The load instruction LDR within the "CHECK(Xx)" function of FIG. 7 can be replaced with the predetermined type of load.

These measures ensure mutual exclusion because in the example shown above, when the transaction on processing element P1 executes the predetermined type of load on the lock variable, this will clear the exclusive monitor indications set for the lock variable by processing element P0, and so when the subsequent store-exclusive instruction STXR is executed on processing element P0 then this instruction will fail because the exclusive monitor is no longer set. This means that even if speculative execution results in the load of the x variable being hoisted above the execution of the transaction on processing element P1, as the spin lock code failed on processing element P0, the spin lock code aborts its current attempt to execute the critical section of code using the x variable and then loops back to try to claim the lock another time and this time if the lock claiming is successful the load of the x variable will see the value resulting from the committed updates provided by the transaction on processing element P1 rather than the stale value read before the transaction was executed.

Similarly, if the timing between the operations on processing elements P0 and P1 had been different so that the load of the lock variable within the transaction in processing element P1 occurred before the load exclusive instruction on processing element P0, then setting of the exclusive indication is broadcast to other processing elements, to allow the other processing elements to abort a transaction which has the same address in its read set of addresses tracked by the address tracking circuitry 124. This prevents mutual exclusion being lost because this time the transaction will fail and on a subsequent attempt to execute the transaction after the lock variable has been released by the spin lock code on processing element P0, the transaction will now see the value of the x variable that resulted from the successful completion of the critical section of code on the other processing element P0.

Figure 9:
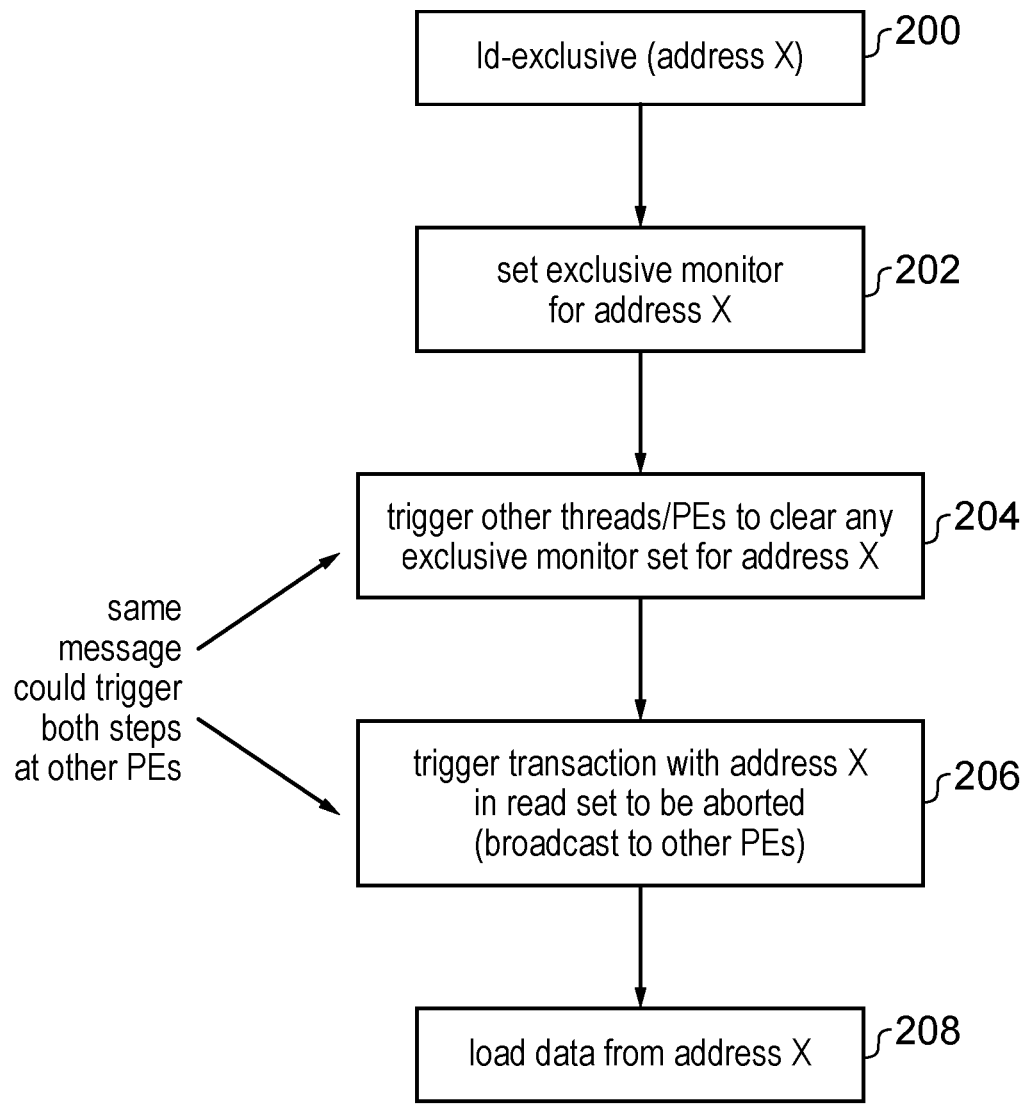
FIG. 9 is a flow diagram showing a method of handling a load exclusive instruction.

FIG. 9 shows a method of responding to a load-exclusive instruction specifying a given address X. The load-exclusive instruction is executed by a given processing element 6 at step 200. In response, at step 202 the processing element 6 triggers setting of an exclusive monitor indication for address X. If the maximum number of addresses for which exclusive monitor indications can simultaneously be set has already been reached, then step 202 may also trigger clearing of an exclusive monitor indication associated with a previously set address.

At step 204 the setting of the exclusive monitor for address X triggers other processing elements 6 or threads to clear any exclusive monitor already set for address X and/or triggers the global exclusive monitor 32 to clear any exclusive monitor set by other processing elements or threads for address X. Also, at step 206 the setting of the exclusive monitor for address X on one processing element triggers any transaction with address X in its working set (read set) of addresses to be aborted. In some cases, the actions shown in steps 204 and 206 may be triggered by separate messages routed by the interconnect 10, or alternatively both actions may be triggered by the same message.

At step 208, in response to the load-exclusive instruction the data from address X is loaded into the register of the processing element 6 which executed the load-exclusive instruction. For example this data could be obtained from the cache 8 of that processing element, or from caches in other processing elements or in the interconnect 10, or from main memory 16.

Figure 10:
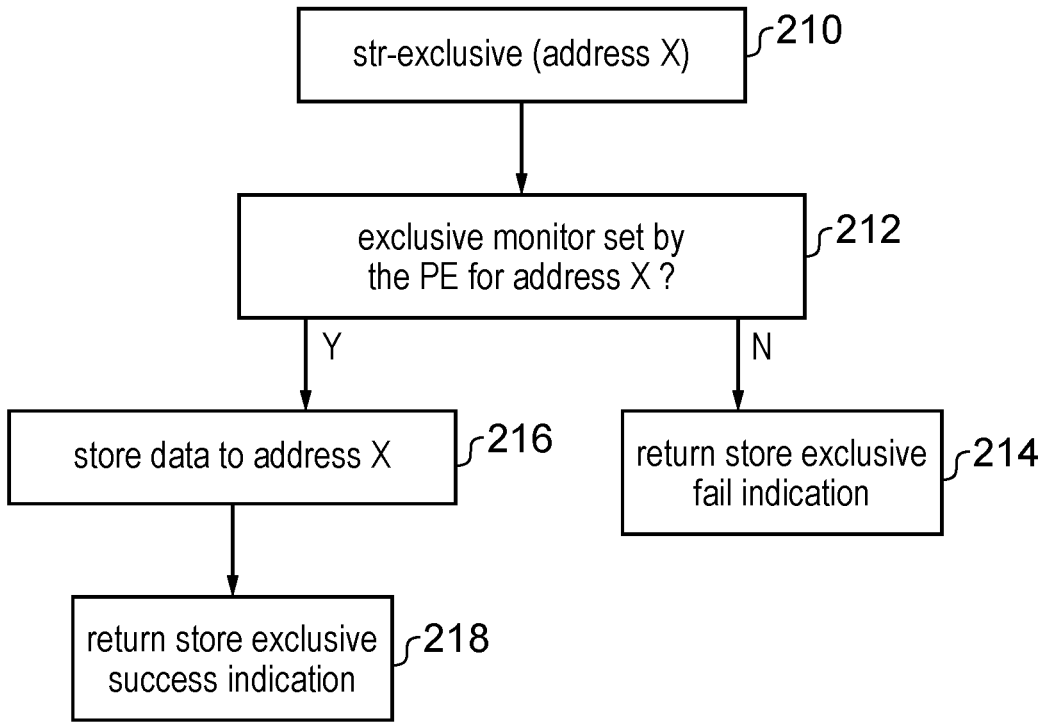
FIG. 10 is a flow diagram showing a method of handling a store exclusive instruction.

FIG. 10 shows a method of processing a store-exclusive instruction processed by a given processing element 6. At step 210 a store-exclusive instruction specifying a given address X is executed by a given processing element 6. In response, at step 212 the processing element 6 determines whether an exclusive monitor has been set by the given processing element for address X. If not, then at step 214 a store-exclusive fail indication is returned (e.g. a predetermined value set to a register) and the store operation is not carried out (a data value in a register specified by the store-exclusive instruction is not written to the cache or memory). If the exclusive monitor for the given processing element is still set for address X, then at step 216 the data from a register specified by the store exclusive instruction is stored to the location in the cache or memory associated with address X, and at step 218 the processing element returns a store-exclusive success indication, for example a different value stored to a register than the value returned in the fail case at step 214. This value can for example be checked by subsequent conditional branch instructions to determine whether to proceed to a section of code which accesses the resource for which mutual exclusion has to be enforced.

Figure 11:
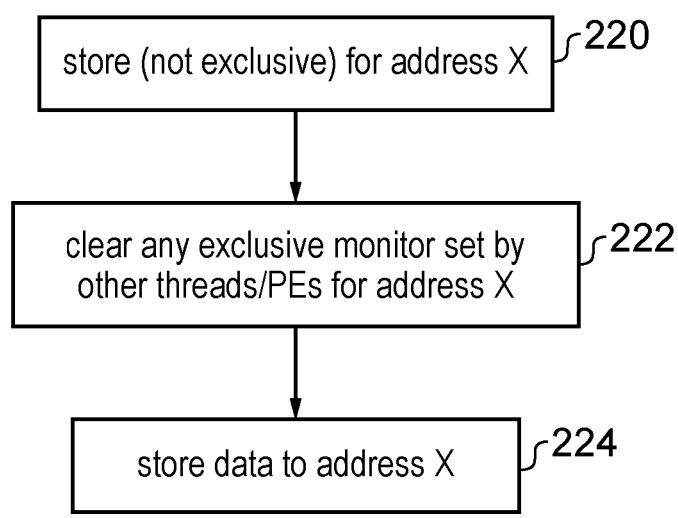
FIG. 11 is a flow diagram showing a method of handling a store instruction.

FIG. 11 shows handling of a store instruction which is not a store-exclusive instruction. At step 220 the store instruction specifying address X is executed by a given processing element and in response at step 222 any exclusive monitor indication set by other threads or processing elements for address X is cleared. At step 224 data from a register specified by the store instruction is stored to the cache or memory at a location associated with address X. The store instruction may also be detected as a conflicting access for any transactions which specify address X within their read or write sets of addresses tracked by the address tracking circuitry 124.

Figure 12:
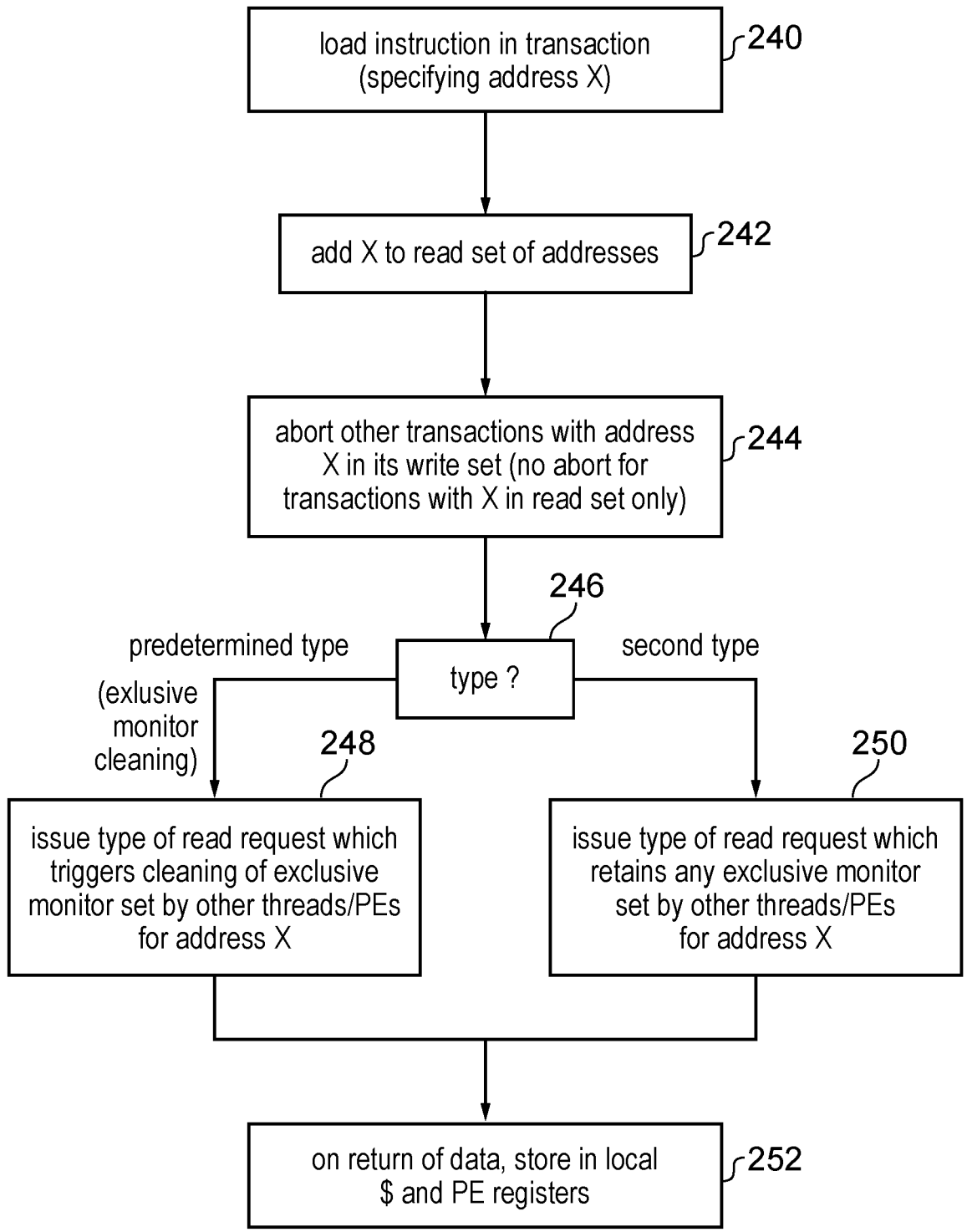
FIG. 12 is a flow diagram showing a method of handling a load instruction executed within a transaction.

FIG. 12 illustrates a method of handling load instructions executed by a processing element 6 within a transaction. At step 240 a load instruction is executed within a transaction, the load instruction specifying a given load target address X. In response, at step 242 the address tracking circuitry adds address X to its working set (read set) of addresses. At step 244, any other transactions which have address X in their write set of addresses are aborted (it is not necessary to abort transactions which have address X in their read set).

At step 246, the type of load instruction is identified. If the load instruction is of a predetermined type (exclusive monitor clearing type) then at step 248 the processing element 6 which executed the load instruction issues to the interconnect 10 a type of read request which triggers clearing of any exclusive monitor indication set by other processing elements or threads for the address X. On the other hand, if the type of load is a second type (non-exclusive monitor clearing type) of load instruction, then at step 250 the processing element 6 issues a type of read request which allows the exclusive monitor already set for address X by other threads or processing elements to be retained. Regardless of the type of load instruction, at step 252, when the data is returned in response to the read request (either from a local cache 8 of the processing element 6, or from the interconnect 10 after fetching the data from another processing element's cache 8 or main memory 16), the data is written back to a register 106 specified by the load instruction, and if not already in the local cache 8 of the processing element 6, may also be allocated into the local cache 8.

Hence, by providing a special type of load instruction which triggers clearing of exclusive monitors (unlike the second type of load), this enables the load for checking a lock variable within a transaction to clear any previously set exclusive monitor for the lock address set by a non-transactional thread, so that even if there is load speculation the mutual exclusion can be maintained.

Figure 13:
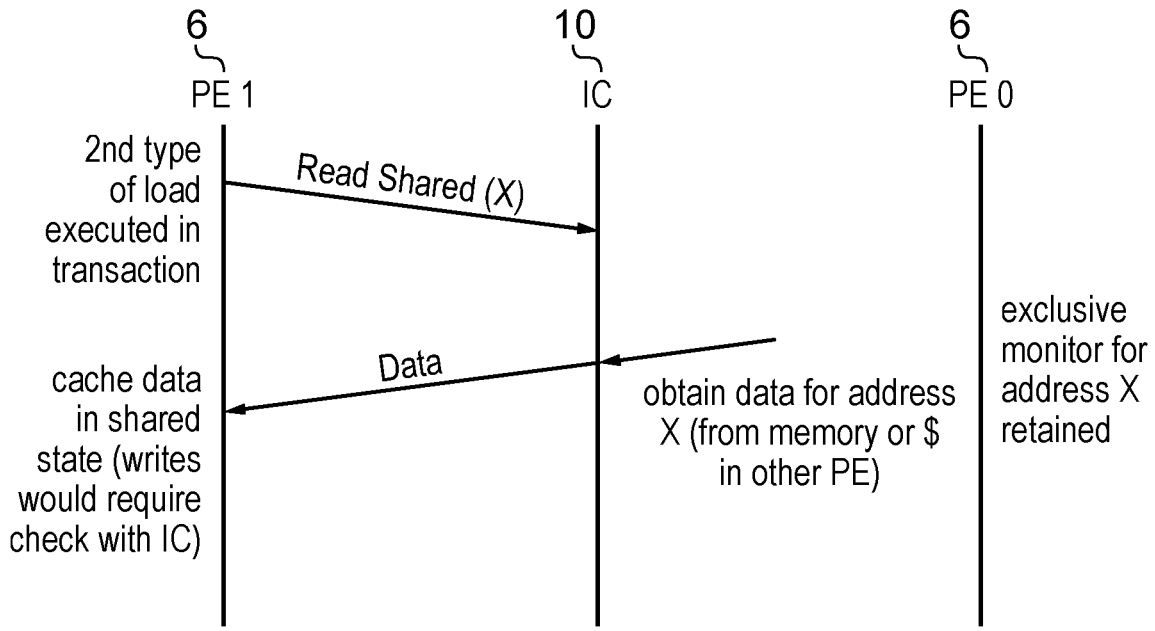
FIGS. 13 to 15 show examples of coherency messages supported by the interconnect.
Figure 14:
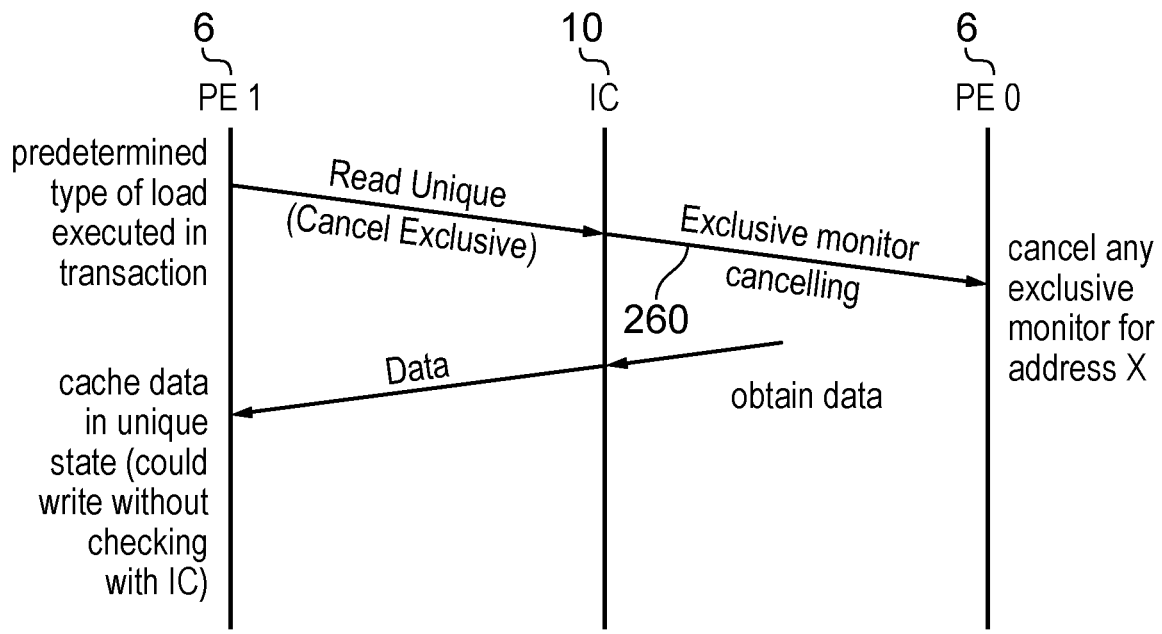
Figure 15:
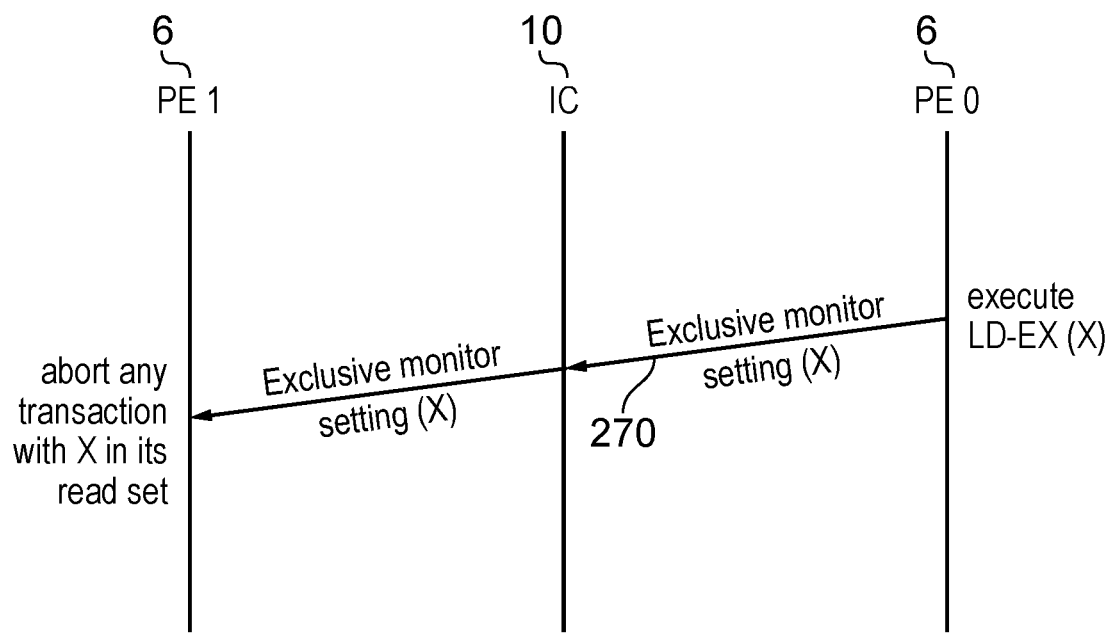

FIGS. 13 to 15 show examples of messaging between two processing elements PE0, PE1 (6) and the interconnect 10. In these examples, it is assumed that processing element PE1 is executing a transactional thread checking address X as a lock variable, and PE0 is executing a non-transactional thread that is setting an exclusive monitor indication for lock variable address X (similar to the example shown above).

FIG. 13 shows handling of the second type of load instruction shown in FIG. 12. In response to the second type of load instruction, PE1 issues a ReadShared request to the interconnect 10 specifying the target address X of the load instruction. The interconnect 10 sends out any snoop messages required to identify the most up to date value of the data for address X, and obtains the data, which may be in a local cache 8 of another processing element 6, or within the system cache 20 or memory 16. The interconnect 10 returns the data to the processing element 6, which caches the data in a "shared" state which indicates that any future write to the data would require a check with the interconnect (as data held at other locations may need to be invalidated in the event of a write by PE1 to its locally cached copy). With the second type of load instruction, there is no need to clear any previously set exclusive monitor indication for address X. Hence, PE0 may retain any exclusive monitor for address X if previously set by a non-transactional thread.

FIG. 14 shows handling of the predetermined type of load instruction, in response to which PE1 sends a "ReadUnique" request to the interconnect 10, which requests that the data is returned to PE1 in a state where further writes to the data can be performed without checking with the interconnect 10. The ReadUnique message causes the interconnect 10 to transmit an exclusive monitor cancelling message 260 to other processing elements, which in this example triggers PE0 to cancel its exclusive monitor already set for address X. Having obtained the data, the data is returned to PE1 in a "Unique" state in which writes are permitted to locally cached data without checking again with the interconnect 10. The ReadUnique message may also trigger the interconnect to invalidate cached copies of data for address X held in other caches 8, 20 of the system.

In other examples, rather than using a "ReadUnique" request which returns data in a "Unique" state, a different form of coherency message could be issued to the interconnect 10 by PE1 in response to the predetermined form of load instruction, which does not return the data in the Unique state (e.g. instead the data could be returned in a "Shared" state in which a further message to the interconnect 10 is required in order for a write to the cached data to be accepted, so that other cached copies can be invalidated if necessary), but which still triggers the exclusive monitor cancelling message 260 to ensure previously set exclusive monitor indications for address X are cancelled. In practice, the expected use case for the predetermined type of load is for checking lock variables, for which writes are not expected within a transaction, so it is not essential to return the data in a "Unique" state. Nevertheless, by defining a form of coherency message to trigger cancelling of the exclusive monitor in response to a load instruction, this can help to improve interworking between transactional and non-transactional threads as discussed above.

FIG. 15 shows the messaging when PE0 executes a load-exclusive instruction specifying address X as its target address. In response, an exclusive monitor setting message 270 is sent to the interconnect 10, which is passed on to any other processing elements 6 which support transactional memory. In response to the exclusive monitor setting message 270, PE1 aborts a transaction having address X in the read set. The form of the exclusive monitor setting message 270 transmitted from PE0 to the interconnect 10 could be the same as, or different to, the form of the exclusive monitor setting message sent from the interconnect 10 to other processing elements 6 such as PE1.

Figure 16:
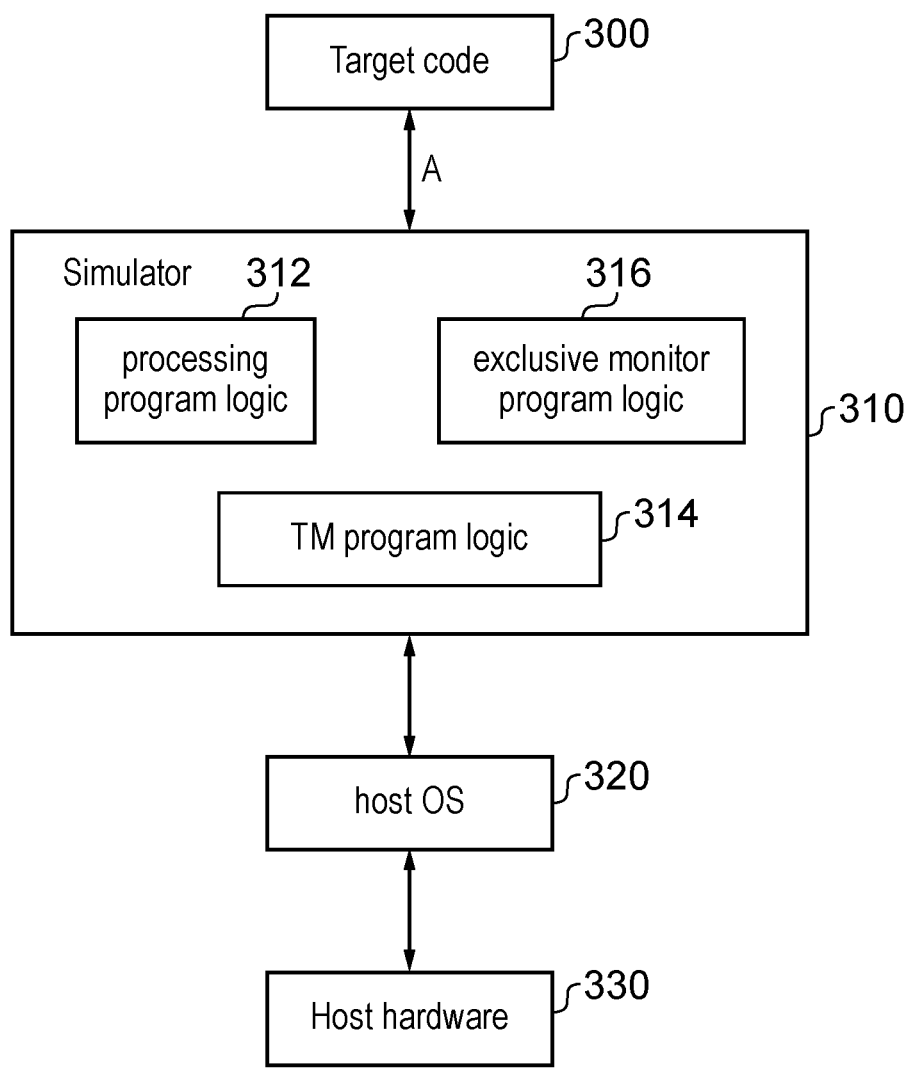
FIG. 16 shows a simulator implementation that can be used.

FIG. 16 illustrates a simulator implementation that may be used. While the earlier described embodiments implement the present technique in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300, including the predetermined type of load instruction and load/store-exclusive instructions described above, may be executed from within the instruction execution environment using the simulator program 310, so that a host computer 330 which does not actually have the hardware features of the apparatus 2 discussed above can emulate these features. The simulator program 310 may include processing program logic 312, transactional memory program logic 314 and exclusive monitor program logic 316 providing functionality corresponding to the processing logic 104, hardware transactional memory resources 120 and exclusive monitor 30, 32 respectively.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to process threads of data processing; and
transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, the transaction memory support circuitry comprising conflict detection circuitry to trigger an abort of the transaction in response to detecting a conflicting access from another thread to one of a working set of addresses tracked for the transaction; in which:
in response to a load-exclusive instruction specifying a given address, the processing circuitry is configured to set an exclusive monitor indication for the given address;
in response to a store-exclusive instruction specifying the given address, the processing circuitry is configured to return a store-exclusive fail indication when the given address no longer has the exclusive monitor indication set;
in response to said load-exclusive instruction specifying the given address, at least one of the processing circuitry and the transactional memory support circuitry is configured to trigger an abort of a transaction for which the given address is specified as one of the working set of addresses; and
in response to a predetermined type of load instruction specifying a load target address, which is executed within a given transaction, the processing circuitry is configured to trigger clearing of any exclusive monitor indication previously set for the load target address in response to a load-exclusive instruction specifying the load target address and which would be checked in response to a store-exclusive instruction specifying the load target address.

2. The apparatus according to claim 1, in which the processing circuitry comprises a plurality of processing elements capable of parallel execution of multiple threads of processing.

3. The apparatus according to claim 2, in which in response to the load-exclusive instruction being executed on a given processing element of the plurality of processing elements, the given processing element is configured to trigger transmission of a message to at least one other processing element, the message indicating that the exclusive monitor indication was set for said given address.

4. The apparatus according to claim 2, in which in response to the predetermined type of load instruction being executed on a given processing element of the plurality of processing elements, the given processing element is configured to trigger transmission of a message to at least one other processing element of the plurality of processing elements, the message indicating that any exclusive monitor indication previously set by said at least one other processing element for the load target address should be cleared.

5. The apparatus according to claim 1, in which in response to the predetermined type of load instruction executed within the given transaction, the processing circuitry is configured to add the load target address to the working set of addresses for the given transaction.

6. The apparatus according to claim 1, in which in response to a second type of load instruction specifying a load target address, which is executed within the given transaction, the processing circuitry is configured to retain any previously set exclusive monitor indication for the load target address.

7. The apparatus according to claim 1, in which the processing circuitry is configured to support a given thread speculatively executing a load instruction for loading a data value from a target address before the processing circuitry has resolved whether a lock variable for controlling exclusive access to said target address has been successfully claimed by the given thread.

8. The apparatus according to claim 1, comprising exclusive monitor circuitry to trigger clearing of the exclusive monitor indication set for the given address in response to detecting one of:
the processing circuitry executing a load-exclusive instruction specifying the given address or another address;
the processing circuitry executing said predetermined type of load instruction specifying the given address as the load target address; and
a store operation to store data to a memory location corresponding to the given address.

9. The apparatus according to claim 1, in which the transaction memory support circuitry also comprises at least one of:
speculative result storage circuitry to store results of speculatively executed instructions for at least one transaction; and
restoration state storage circuitry to store state captured in response to the transaction start instruction to be restored on aborting the transaction.

10. A non-transitory, computer-readable storage medium storing a computer program, which when executed, controls a host data processing apparatus to provide an instruction execution environment for execution of threads of data processing; the computer program comprising:
processing program logic to process threads of data processing; and
transactional memory program logic to support execution of a transaction within a thread processed by the processing program logic, the transaction comprising instructions of the thread executed speculatively between a transaction start instruction and a transaction end instruction, for which the processing program logic is configured to prevent commitment of results of the speculatively executed instructions until the transaction end instruction is reached, the transaction memory program logic comprising conflict detection program logic to trigger an abort of the transaction in response to detecting a conflicting access from another thread to one of a working set of addresses tracked for the transaction; in which:
in response to a load-exclusive instruction specifying a given address, the processing program logic is configured to set an exclusive monitor indication for the given address;
in response to a store-exclusive instruction specifying the given address, the processing program logic is configured to return a store-exclusive fail indication when the given address no longer has the exclusive monitor indication set;
in response to said load-exclusive instruction specifying the given address, at least one of the processing program logic and the transactional memory program logic is configured to trigger an abort of a transaction for which the given address is specified as one of the working set of addresses; and
in response to a predetermined type of load instruction specifying a load target address, which is executed within a given transaction, the processing program logic is configured to trigger clearing of any exclusive monitor indication previously set for the load target address in response to a load-exclusive instruction specifying the load target address and which would be checked in response to a store-exclusive instruction specifying the load target address.

11. An apparatus comprising:
processing circuitry to process threads of data processing; and
transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, the transaction memory support circuitry comprising conflict detection circuitry to trigger an abort of the transaction in response to detecting a conflicting access from another thread to one of a working set of addresses tracked for the transaction; in which:
in response to a load-exclusive instruction specifying a given address, the processing circuitry is configured to set an exclusive monitor indication for the given address;

in response to a store-exclusive instruction specifying the given address, the processing circuitry is configured to return a store-exclusive fail indication when the given address no longer has the exclusive monitor indication set;

in response to a predetermined type of load instruction specifying a load target address, which is executed within a given transaction, the processing circuitry is configured to trigger clearing of any exclusive monitor indication previously set for the load target address;

in response to said load-exclusive instruction, at least one of the processing circuitry and the transactional memory support circuitry is configured to trigger an abort of a transaction for which the given address is specified as one of the working set of addresses;

the processing circuitry comprises a plurality of processing elements capable of parallel execution of multiple threads of processing; and in response to the predetermined type of load instruction being executed on a given processing element of the plurality of processing elements, the given processing element is configured to trigger transmission of a message to at least one other processing element of the plurality of processing elements, the message indicating that any exclusive monitor indication previously set by said at least one other processing element for the load target address should be cleared.

* * * * *